Sept. 6, 1927.  1,641,435
R. S. JACOBSEN
MECHANISM FOR OPERATING RECIPROCATING CONVEYERS OR SCREENS
Filed Feb. 12, 1923
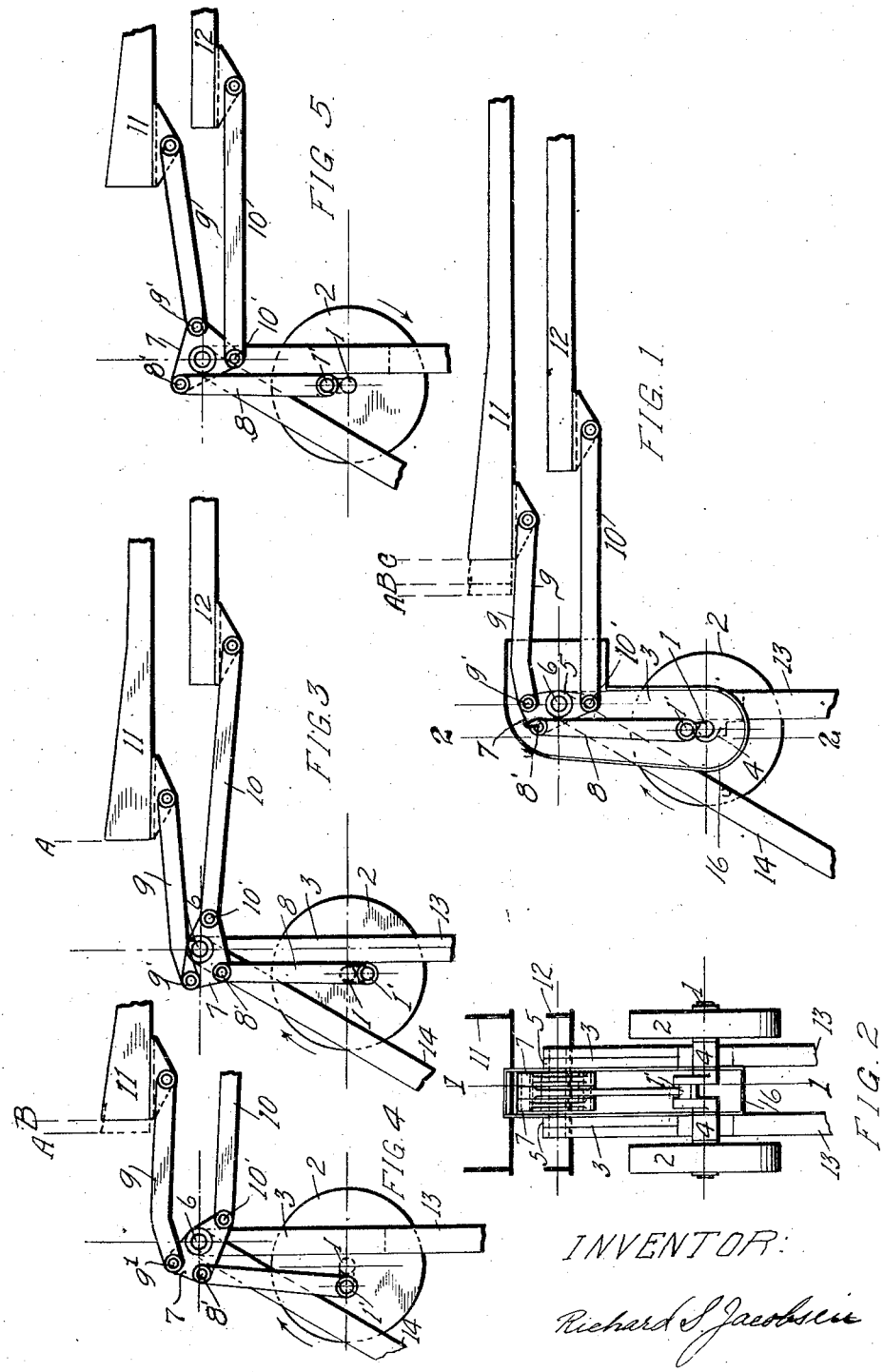
INVENTOR:
Richard S Jacobsen Patented Sept. 6, 1927.

1,641,435

UNITED STATES PATENT OFFICE.

RICHARD S. JACOBSEN, OF WHEATON, ILLINOIS.

MECHANISM FOR OPERATING RECIPROCATING CONVEYERS OR SCREENS.

Application filed February 12, 1923. Serial No. 618,633.

The invention relates to mechanisms for operating reciprocating conveyers or screens.

The object is to provide a simple and efficient mechanism, which will allow two troughs to be reciprocated simultaneously in opposite directions, so that the reaction of the one is counteracted by the other, thereby reducing vibrations of the structure. Other objects will appear from the following description.

The invention consists in the several novel features hereinafter set forth and particularly pointed out in the claims.

In the drawing Fig. 1 is a sectional side elevation taken on line 1—1 of Fig. 2.

Fig. 2 is a sectional end elevation taken on line 2—2 of Fig. 1.

Fig. 3 is a side elevation showing the troughs in extreme backward position.

Fig. 4 is a side elevation showing position of the upper trough, when the crank on the drive shaft is in center position.

Fig. 5 is a side elevation showing a modified form of the invention.

Referring in detail to the drawings, 1 designates the crank shaft, 1' the crank and 2 the pulleys mounted on said crank shaft. 3 are side frames. Integral with frames 3 are journals 4, which support shaft 1. The extreme upper end of frames 3 form bearings 5 for shaft 6. On shaft 6 are loosely mounted two rockers 7, separated sufficiently apart to allow room for connecting rods 8, 9 and 10 to operate between same. Pins 8', 9' and 10' passing through said rockers 7 and ends of connecting rods 8, 9 and 10 form the connections between same. At its lower end, rod 8 is connected to crank 1', thus operatively linking shaft 1 with rockers 7.

Rod 9 is at its other end pivotally connected to trough 11 and rod 10 is similarly connected to trough 12. Troughs 11 and 12 may be supported in any convenient manner on the structure, either by hangers or on rollers.

Frames 3, supporting the drive mechanism are secured to building posts 13, which are braced by batter posts 14.

An oil tight casing 16 adapted to hold oil is provided for the crank to operate in. The side of the casing is extended upward, enclosing crank 1', rod 8 and rockers 7 and act as a safety guard and also prevents material from dropping into the oil chamber.

The operation of the device may briefly be described as follows:

Shaft 1 is caused to revolve by means of power being transmitted by belting to pulley 2 from a line shaft or motor. Crank 1', which is integral with shaft 1, will by means of rod 8 cause rockers 7 to swing back and forth nearly 90 degrees for each revolution of crank 1', which movement will by means of rods 9 and 10 cause troughs 11 and 12 to reciprocate in opposite directions.

The connections of rods 9 and 10 to rockers 7 are so relatively disposed with reference to shaft 6, that their path of operation will be an arc beginning near the horizontal centerline of shaft 6 as shown in Fig. 3, when crank 1' is in its lowest position and terminating at a point near the vertical centerline of shaft 6 as shown in Fig. 1, when crank 1' is in its highest position.

At the beginning of the stroke as shown in Fig. 3, the circumferential movement of pins 9' and 10', will cause very little horizontal movement to troughs 11 and 12, much of the movement being lost in a vertical direction. As the stroke advances, this relation of the movement of the troughs to pins 9' and 10' will gradually change until at the end of the stroke as shown in Fig. 1, the entire movement of pins 9' and 10' is transmitted to the troughs in a horizontal direction.

A represents the extreme backward position of trough 11 as shown in Fig. 3. B represents the position of trough 11, when crank 1' has made a quarter revolution as shown in Fig. 4 and C represents the extreme forward position of trough 11, when crank 1' has made one half revolution as shown in Fig. 1. The return stroke will be reversedly identical and the position of trough 11 will be at B, when crank 1' has made three quarters of a revolution.

The position of the lower trugh 12 will be reversedly identical to trough 11, since its connection 10' to rocker 7 is diametrically opposite connection 9' for trough 11 above described.

It will be noted, that during the first quarter revolution of crank 1', trough 11 moves only from A to B, while during the second quarter revolution of crank 1', trough 11 moves from B to C or almost twice the distance in the same time and on the return stroke reversedly as above.

Thus it will be seen, that the movement of trough 11 is slow at first, then gradually accelerates toward the end of the forward stroke and then returns at a speed reversedly identical to the forward travel.

This movement will cause any granular material on the trough to move forward during the return stroke as the inertia of the material at the end of the forward stroke will be greater than the friction between the material and the trough.

The trough 12, which travels in opposite direction of trough 11 will tend to counteract the reaction of the latter, thereby reducing the vibrations to the building to a minimum.

The direction of the conveying action, may be made the same on the two troughs 11 and 12, by locating pin 9' in a position approximately 90 degrees from that shown in Figures 1, 3 and 4 as indicated in Fig. 5. When pin 9' is located as in Fig. 5 the greatest horizontal speed of trough 11 is at the beginning of the forward travel of trough 12 and the slowest speed of trough 11 is towards the end of the forward travel of trough 12. This is a reversal of the order from that indicated in Figs. 1, 3 and 4 and consequently the conveying action is reversed on trough 11.

Thus it will be seen that the disk 2 has clockwise rotation to oscillate the rocker arm 7, and the arrangement is such that the pivots $9^1$ and $10^1$ move back and forth within the space between the vertical and horizontal center lines of the axis 6 about which the arm 7 rocks or oscillates. Thus the pivotal point $9^1$ starts upward slowly and gains speed and terminates its motion on the vertical center line of the axis 6, while the pivotal point $10^1$ starts downward slowly and increases its speed and finally stops on the vertical center line, and then the motion is reversed, in the manner shown and described. Thus the trough or conveyer 11 reverses its motion, at one end of its stroke, while the pivotal point $9^1$ is moving horizontally, and reverses its motion at the other end of its stroke while said pivotal point $9^1$ is moving downwardly very nearly vertically; and the trough or conveyer 12 has a similar back and forth motion, because of the location and length of the path of travel of the pivotal point $10^1$ which moves back and forth between the under side of the horizontal center line of the axis 6 and the vertical center line of said axis. Thus the stroke of each trough or conveyer, in one direction, 11 and 12, is interrupted and reversed while the pivotal points $9^1$ and $10^1$ are moving horizontally, and preferably while they are on the vertical center line of the axis 6, or substantially so, in the manner shown and described. This balances one trough or conveyer against the other, and at the same time ensures an effective conveying motion, so that notwithstanding the back and forth motion of the troughs or conveyers, the materials thereon will nevertheless be conveyed longitudinally thereof in the desired direction and manner. Furthermore, it will be seen that one trough or conveyer is stopped and caused to reverse its forward motion, at the end of its forward stroke, when the pivotal point $8^1$ is above the horizontal center line of the axis 6, whereas the other trough or conveyer reverses its motion, at the end of its forward stroke, at a time when said pivotal point $8^1$ is substantially the same distance below said horizontal center line. The rocker actuating mechanism is, therefore, so constructed and operated that the one trough 11 moves forward with gradually increasing speed while the other trough 12 is moving backward with gradually increasing speed, and when trough 11 reverses its motion and moves backward with gradually decreasing speed while the trough 12 moves forward with gradually decreasing speed. Thus when one trough is moving in one direction with gradually increasing speed, the other trough is moving in the opposite direction with gradually increasing speed; and when the motion is reversed one trough is then moving in one direction at gradually decreasing speed, while the other trough is moving in the opposite direction with gradually decreasing speed.

Having thus described the invention, what I claim is:

1. In a device of the class described, a crank shaft, a rocker arm, means for connecting the shaft to the arm, a plurality of reciprocating troughs, and a connecting rod pivotally connected between each trough and rocker arm, the center of the pivotal connection between each rod and rocker arm operating in a segmental path confined between the vertical and horizontal center lines of the fulcrum of said rocker arm, one above and the other below said horizontal line, thereby to produce a conveying motion in each trough.

2. In a device of the class described, a crank shaft, a rocker arm, means for connecting the shaft to the arm, reciprocating troughs, one above the other, connecting rods pivotally connected between said troughs and rocker arm, the centers of the pivotal connections between said rods and rocker arm operating in segmental paths between the vertical and horizontal center lines of the fulcrum of said rocker arm, one above and the other below said horizontal line, thereby to produce a conveying motion in opposite directions in said troughs.

3. In a device of the class described, a crank shaft, a rocker arm, means for connecting the shaft to the arm, reciprocating troughs, connecting rods pivotally connected between said troughs and rocker arm, operating in segmental paths between the vertical and horizontal center lines of the fulcrum of said rocker arm, said connections disposed diametrically opposite the center of said fulcrum to reciprocate the troughs in opposite directions, thereby to produce a conveying action in opposite directions.

4. In a device of the class described, a crank shaft, a rocker arm, means for connecting the shaft to the arm, a reciprocating trough, a connecting rod pivotally connected between said trough and rocker arm, the center of the pivotal connection between said rod and rocker arm operating in a segmental path between the vertical and horizontal center lines of the fulcrum of said rocker arm, thereby to produce a conveying motion in said trough, said crank shaft being subdisposed to said rocker arm, and said connecting means having a pivotal center on said rocker arm which is movable up and down across said horizontal line.

5. In a device of the class described, a crank shaft, a rocker arm, means for connecting the shaft to the arm, a reciprocating trough, a connecting rod pivotally connected between said trough and rocker arm, the center of the pivotal connection between said rod and rocker arm operating in a segmental path between the vertical and horizontal center lines of the fulcrum of said rocker arm, thereby to produce a conveying motion in said trough, said crank shaft being subdisposed to said rocker arm, and an oil chamber for enclosing said crank, extending upward and over said rocker arm.

6. In a device of the class described, a crank shaft, a double rocker arm having space between the two halves thereof, means between the two halves for connecting the shaft to the arm, a reciprocating trough, a connecting rod pivotally connected between said trough and rocker arm, interposed between the two halves, operating in a segmental path between the vertical and horizontal center lines of the fulcrum of said rocker arm, thereby to produce a conveying action in said trough, and means outside of said halves, at opposite sides, to support said arm for rocking motion thereof.

7. In conveying apparatus, the combination of a pair of reciprocating conveyer troughs, an oscillatory rocker arm having diametrically opposite pivotal points thereon, means to connect said pivotal points with said troughs, and mechanism to oscillate said rocker arm in a manner to cause each trough to reverse its motion, at the end of its stroke, in one direction, at a time when both pivotal points are on the vertical center line, or substantially so, of the axis of motion of said rocker arm.

8. A structure as specified in claim 7, said mechanism comprising a third pivotal point on said rocker arm, a crank, a link connecting said third pivotal point with said crank, whereby said third pivotal point moves back and forth substantially the same distance above and below the horizontal center line of the axis of said rocker arm.

9. A structure as specified in claim 7, said mechanism comprising means limiting the oscillation of said rocker arm in a manner to cause said troughs to always reverse their motion, in opposite directions, while said two pivotal points are one above and the other below the horizontal center line of the axis of said rocker arm.

10. A structure as specified in claim 7, said reversal of motion occurring at the end of the forward stroke of one trough, and at the end of the backward stroke of the other trough.

11. A structure as specified in claim 7, the two troughs reciprocating in opposite directions, one trough moving with gradually increasing speed in one direction while the other trough is moving with gradually increasing speed in the opposite direction, and the one trough thereafter moving backward with gradually decreasing speed while the other trough moves forward with gradually decreasing speed, substantially as shown and described.

In testimony, that I claim the foregoing as my own, I have hereto affixed my signature.

RICHARD S. JACOBSEN.